United States Patent
Farre Guiu et al.

(10) Patent No.: US 12,003,831 B2
(45) Date of Patent: Jun. 4, 2024

(54) AUTOMATED CONTENT SEGMENTATION AND IDENTIFICATION OF FUNGIBLE CONTENT

(71) Applicant: Disney Enterprises, Inc., Burbank, CA (US)

(72) Inventors: Miquel Angel Farre Guiu, Bern (CH); Marc Junyent Martin, Barcelona (ES); Pablo Pernias, Sant Joan d'Alacant (ES)

(73) Assignee: Disney Enterprises, Inc., Burbank, CA (US)

( * ) Notice: Subject to any disclaimer, the term of this patent is extended or adjusted under 35 U.S.C. 154(b) by 66 days.

(21) Appl. No.: 17/366,675

(22) Filed: Jul. 2, 2021

(65) Prior Publication Data
US 2023/0007365 A1    Jan. 5, 2023

(51) Int. Cl.
*H04N 21/845* (2011.01)
*G06N 20/00* (2019.01)
*H04N 21/466* (2011.01)
*H04N 21/8352* (2011.01)

(52) U.S. Cl.
CPC ......... *H04N 21/8456* (2013.01); *G06N 20/00* (2019.01); *H04N 21/4662* (2013.01); *H04N 21/8352* (2013.01)

(58) Field of Classification Search
CPC ........... H04N 21/8456; H04N 21/4662; H04N 21/8352; G06N 20/00
USPC ....................................................... 386/241
See application file for complete search history.

(56) References Cited

U.S. PATENT DOCUMENTS

| | | | |
|---|---|---|---|
| 10,264,273 B2 | 4/2019 | Guiu | |
| 10,755,104 B2 * | 8/2020 | Li | G06F 16/738 |
| 11,354,905 B1 * | 6/2022 | Chen | G06V 40/165 |
| 2016/0094888 A1 * | 3/2016 | Peterson | H04N 21/4821 |
| | | | 725/39 |

(Continued)

FOREIGN PATENT DOCUMENTS

| | | | | |
|---|---|---|---|---|
| EP | 2 985 706 A1 | 2/2016 | | |
| WO | WO-2022022152 A1 * | 2/2022 | ........... | G06K 9/6217 |

OTHER PUBLICATIONS

English Translation of WO 2022022152 (Year: 2022).*

(Continued)

*Primary Examiner* — Loi H Tran
(74) *Attorney, Agent, or Firm* — Farjami & Farjami LLP (57) ABSTRACT

A content segmentation system includes a computing platform having processing hardware and a system memory storing a software code and a trained machine learning model. The processing hardware is configured to execute the software code to receive content, the content including multiple sections each having multiple content blocks in sequence, to select one of the sections for segmentation, and to identify, for each of the content blocks of the selected section, at least one respective representative unit of content. The software code is further executed to generate, using the at least one respective representative unit of content, a respective embedding vector for each of the content blocks of the selected section to provide a multiple embedding vectors, and to predict, using the trained machine learning model and the embedding vectors, subsections of the selected section, at least some of the subsections including more than one of the content blocks.

20 Claims, 6 Drawing Sheets

(56) References Cited

U.S. PATENT DOCUMENTS

2020/0020248 A1\* 1/2020 Lavi .................. G09B 7/00
2021/0042623 A1\* 2/2021 Krishnamoorthy ...... G06N 3/08

OTHER PUBLICATIONS

English Translation of Chinese Publication CN111222476 (Year: 2020).\*
Extended European Search Report dated Nov. 21, 2022 for EP Application 22181723.3.
Nithya Manickam, Arman Parnami, and Sharat Chandran "Reducing False Positives in Video Shot Detection Using Learning Techniques" Pattern Recognition: 5$^{th}$ Asian Conference, ACRP 2019, Auckland New Zealand, Nov. 26-29, 2019, Revised Selected Papers, Part II, vol. 4338, Dec. 13, 2006 pp. 421-432.
Jinqiao Wang, Lingyu Duan, Qingshan Liu, Hanging Lu, and Jesse S. Jin "A Multimodial Scheme for Program Segmentation and Representation in Broadcast Video streams" IEEE Transactions on Multimedia, vol. 10, No. 3, Mar. 21, 2008 pp. 393-408.
Ling-Yu Duan, Jinqiao Wang, Yantao Zheng, Jesse S. Jin, Hanging Lu, and Changsheng Xu "Segmentation, Categorization, and Identification of Commercials from TV Streams Using Multimodial Analysis" ACM Multimedia 2006 & Co-Located Workshops: Oct. 23-27, 2006, Santa Barbara, CA, USA; MM '06; Proceedings, ACM Press Oct. 23, 2006 pp. 201-210.
Lorenzo Baraldi, Constantino Grana and Rita Cicchiara "A Deep Siamese Network for Scene Detection in Broadcast Videos" Multimedia, ACM, Oct. 13, 2015 pp. 1199-1202.
Bogdan Mocanu, Ruxandra Tapu, and Titus Zaharia "A Multimodial High Level Video Segmentation for Content Targeted Online Advertising" Pattern Recognition: 5$^{th}$ Asian.
Conference, ACRP 2019, Auckland New Zealand, Nov. 26-29, 2019, Revised Selected Papers, Part II. Dec. 7, 2020 Springer International Publishing, pp. 506-517.
Bashar Tahayna, Mohammed Belkhatir, Saadat Alhashmi "Automatic Indexing and Recognition of Re-Broadcasted Video Programs through Visual and Temporal Features" Multimedia and Expo, 2008 IEEE International Conference on, IEEE Jun. 23, 2008 pp. 861-864.

\* cited by examiner

AUTOMATED CONTENT SEGMENTATION AND IDENTIFICATION OF FUNGIBLE CONTENT

BACKGROUND

Due to its popularity as a content medium, ever more video in the form of episodic television (TV) and movie content is being produced and made available to consumers via streaming services. As a result, the efficiency with which segments of a video content stream having different bit-rate encoding requirements are identified has become increasingly important to the producers and distributors of that video content.

Segmentation of video and other content has traditionally been performed manually by human editors. However, such manual segmentation of content is a labor intensive and time consuming process. Consequently, there is a need in the art for an automated solution for performing content segmentation that substantially minimizes the amount of content, such as audio content and video content, requiring manual processing.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and computer-readable non-transitory storage media including instructions for performing content segmentation and identification of fungible content that overcome the drawbacks and deficiencies in the conventional art. In various implementations, the content processed using the systems and methods may include video games, movies, or episodic television (TV) content that includes episodes of TV shows that are broadcast, streamed, or otherwise available for download or purchase on the Internet or a user application. Moreover, in some implementations, the content segmentation and fungible content identification solution disclosed herein may advantageously be performed as an automated process.

It is noted that, as used in the present application, the terms "automation," "automated," and "automating" refer to systems and processes that do not require the participation of a human user, such as a human editor or system administrator. For example, although in some implementations a human editor may confirm or reject a content segmentation boundary predicted by the present systems, that human involvement is optional. Thus, the processes described in the present application may be performed under the control of hardware processing components of the disclosed systems.

It is further noted that, as used in the present application, the expression "fungible content," also sometimes referred to as "non-canon content" or "non-cannon content," refers to sections of content that are substantially the same from one version to another of content in which the fungible content is included. Examples of fungible content included in episodic TV content may include the introduction to the episode, credits, and short introductions following a commercial break, to name a few. In a movie, fungible content may include credits, as well as production and post-production short clips prior to the movie, while in a video game, fungible content may include short clips mentioning the game and its production and distribution companies.

It is also noted that, as used in the present application, the expression "computer-readable non-transitory storage medium," as defined in the present application, refers to any medium, excluding a carrier wave or other transitory signal that provides instructions to processing hardware of a computing platform. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Figure 1:
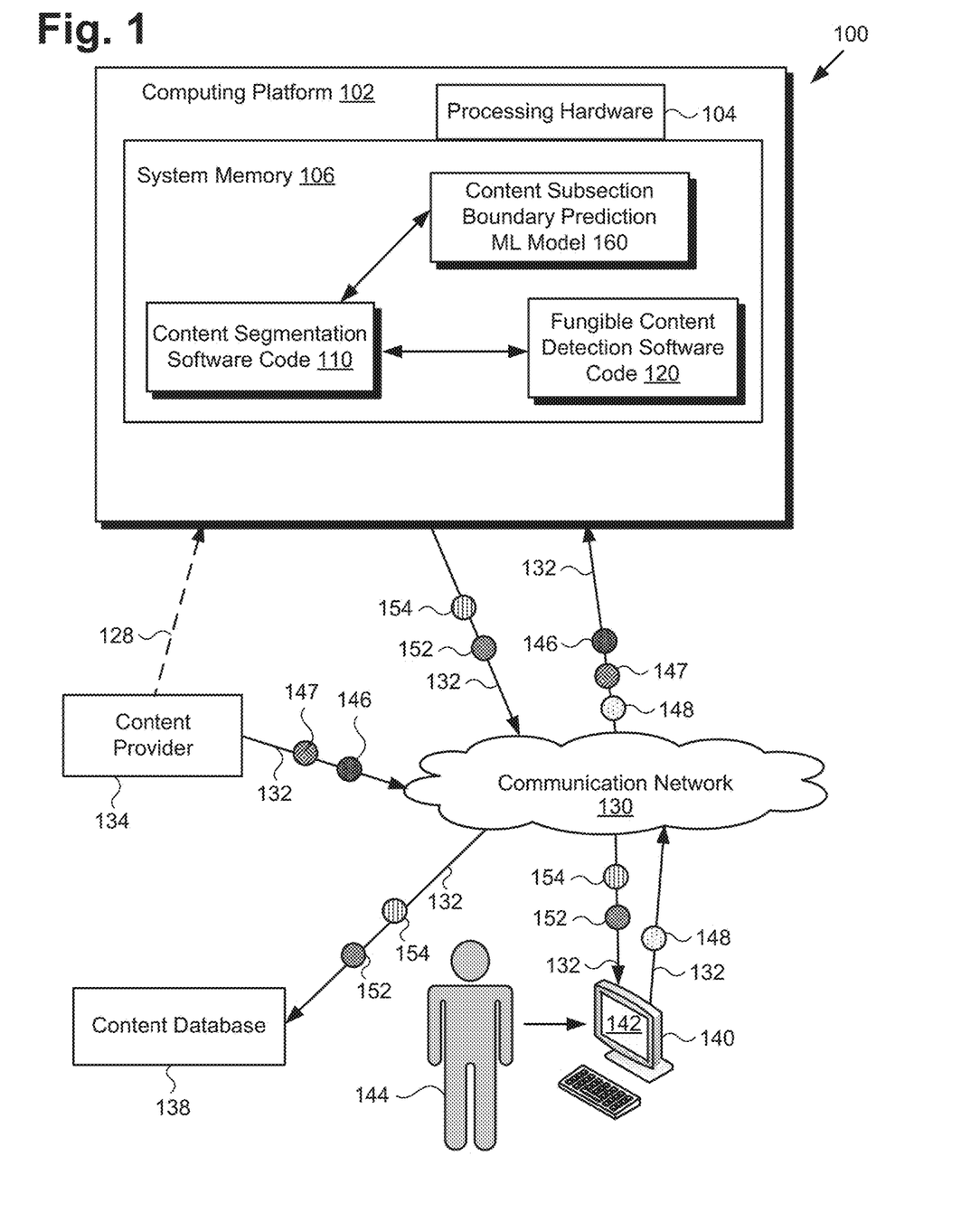
FIG. 1 shows a diagram of an exemplary system for performing content segmentation and identification of fungible content, according to one implementation.

FIG. 1 shows exemplary system 100 for performing content segmentation and identification of fungible content, according to one implementation. As shown in FIG. 1, system 100 includes computing platform 102 having processing hardware 104 and system memory 106 implemented as a computer-readable non-transitory storage medium. According to the present exemplary implementation, system memory 106 stores content segmentation software code 110, fungible content detection software code 120, and trained content subsection boundary prediction machine learning (ML) model 160.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as content segmentation software code 110 and fungible content detection software code 120, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

As further shown in FIG. 1, system 100 is implemented within a use environment including content provider 134 providing content 146 and comparison content 147, content database 138, communication network 130 and content editor 144 utilizing user system 140 including display 142. Also shown in FIG. 1 are network communication links 132 communicatively coupling content provider 134, content database 138, and user system 140 with system 100 via communication network 130, as well as manually segmented content sample 148 provided by content editor 144, segmented content 152, and fungible content identification data 154. It is noted that although system 100 may receive content 146 from content provider 134 via communication network 130 and network communication links 132, in some implementations, content provider 134 may take the form of a content source integrated with computing platform 102, or may be in direct communication with system 100 as shown by dashed communication link 128.

Although the present application refers to content segmentation software code 110 as being stored in system memory 106 for conceptual clarity, more generally, system memory 106 may take the form of any computer-readable non-transitory storage medium, as described above. Moreover, although FIG. 1 depicts content segmentation software code 110, fungible content detection software code 120, and trained content subsection boundary prediction ML model 160 as being stored together in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and system memory resources within system 100. In one implementation, computing platform 102 of system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Content segmentation software code 110, executed by processing hardware 104, may receive content 146 from content provider 134, and may provide segmented content 152 corresponding to content 146 and produced using content subsection boundary prediction ML model 160 as an output in a substantially automated process. Alternatively, or in addition, in some implementations, content segmentation software code 110, executed by processing hardware 104, may receive manually segmented content sample 148 from user system 140, and may utilize manually segmented content sample 148 as a template or recipe for adjusting one or more hyperparameters of content subsection boundary prediction ML model 160 so as to produce segmented content 152 according to editorial preferences of content editor 144, also in a substantially automated process. It is noted that hyperparameters are configuration parameters of the architecture of content subsection boundary prediction ML model 160 that are adjusted during training, either full training or fine tuning. By way of example, the learning rate is a hyperparameter.

In some implementations, manually segmented content sample 148 may include an unsegmented portion and a manually segmented portion provided as a template for completing segmentation of the unsegmented portion in an automated "auto-complete" process. That is to say, a content sample having a time duration of one hour, for example, may have only the first few minutes of content manually segmented by content editor 144. Content segmentation software code 110, executed by processing hardware 104, may then adjust one or more hyperparameters of content subsection boundary prediction ML model 160 to complete segmentation of the unsegmented portion of manually segmented content sample 148 in accordance with the segmentation preferences of content editor 144.

Fungible content detection software code 120, executed by processing hardware 104, may receive content 146, may obtain comparison content 147, and may output fungible content identification data 154 identifying one or more sections of content 146 as fungible content sections. It is noted that, in various implementations, segmented content 152 and fungible content identification data 154, when generated by system 100, may be stored in system memory 106, may be copied to non-volatile storage, or may be stored in system memory 106 and also be copied to non-volatile storage. Alternatively, or in addition, as shown in FIG. 1, in some implementations, segmented content 152 and fungible content identification data 154 may be sent to user system 140 including display 142, for example by being transferred via network communication links 132 of communication network 130.

Although user system 140 is shown as a desktop computer in FIG. 1, that representation is provided merely as an example. More generally, user system 140 may be any suitable mobile or stationary computing device or system that implements data processing capabilities sufficient to provide a user interface, support connections to communication network 130, and implement the functionality ascribed to user system 140 herein. For example, in some implementations, user system 140 may take the form of a laptop computer, tablet computer, or smartphone, for example. However, in other implementations user system 140 may be a "dumb terminal" peripheral component of system 100 that enables content editor 144 to provide inputs via a keyboard or other input device, as well as to view segmented content 152 and fungible content identification data 154 on display 142. In those implementations, user system 140 and display 142 may be controlled by processing hardware 104 of system 100.

With respect to display 142 of user system 140, display 142 may be physically integrated with user system 140 or may be communicatively coupled to but physically separate from user system 140. For example, where user system 140 is implemented as a smartphone, laptop computer, or tablet computer, display 142 will typically be integrated with user system 140. By contrast, where user system 140 is implemented as a desktop computer, display 142 may take the form of a monitor separate from user system 140 in the form of a computer tower. Moreover, display 142 may be implemented as a liquid crystal display (LCD), light-emitting diode (LED) display, organic light-emitting diode (OLED) display, quantum dot (QD) display, or any other suitable display screen that performs a physical transformation of signals to light.

The functionality of content segmentation software code 110 and trained content subsection boundary prediction ML model 160 will be further described by reference to FIGS. 2, 3, 4A, and 4B, while the functionality of fungible content detection software code is further described below by reference to FIG. 5.

Figure 2:
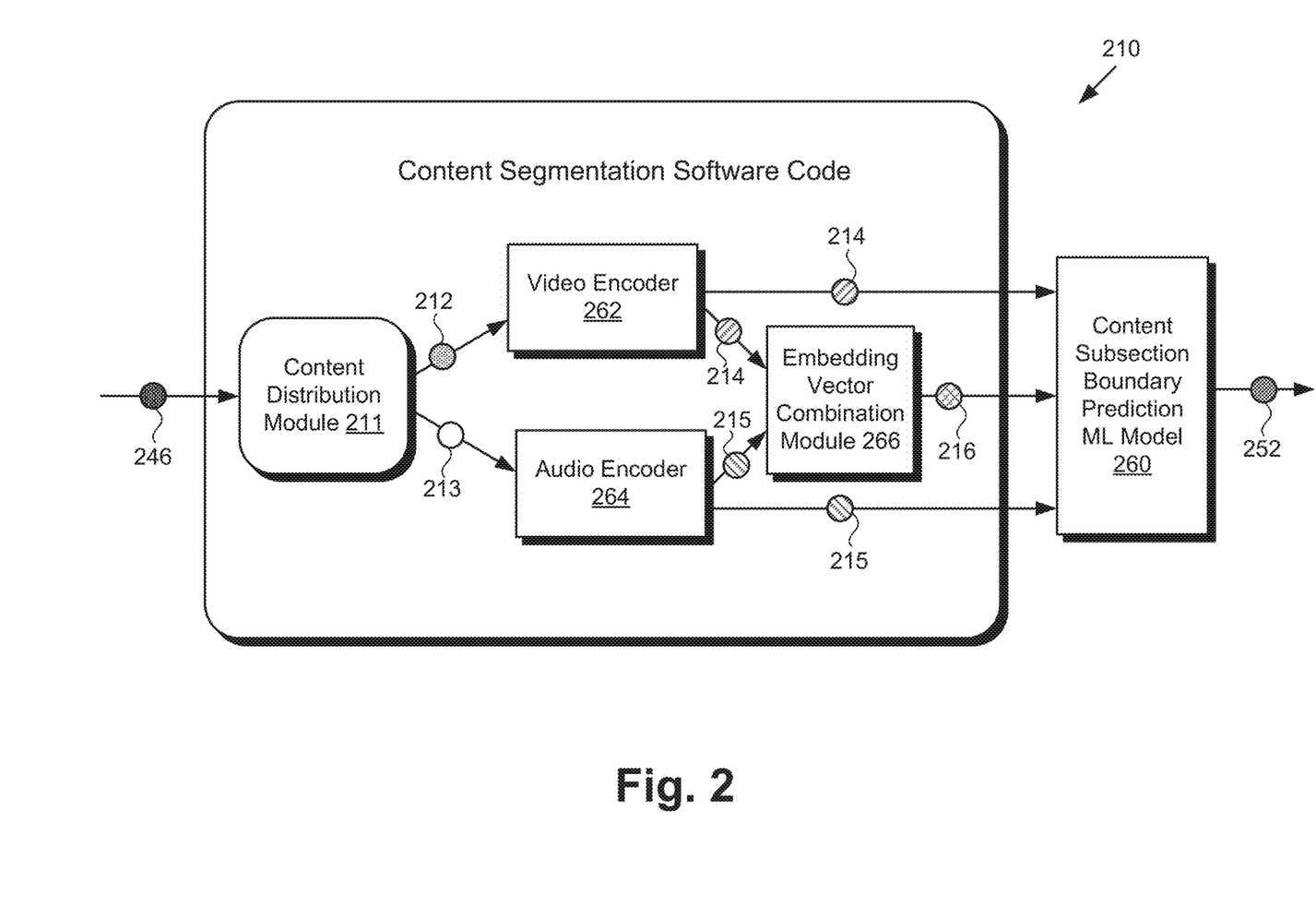
FIG. 2 shows a diagram of an exemplary content segmentation software code suitable for use by the system in FIG. 1, according to one implementation.

FIG. 2 shows a diagram of exemplary content segmentation software code 210 suitable for use by system 100, in FIG. 1, according to one implementation, together with trained content subsection boundary prediction ML model 260. According to the exemplary implementation shown in FIG. 2, content segmentation software code 210 includes content distribution module 211, video encoder 262, audio encoder 264, and embedding vector combination module 266. Also shown in FIG. 2 are content 246, video component 212 of content 246, audio component 213 of content 246, video embedding vectors 214, audio embedding vectors 215, audio-video (AV) embedding vectors 216, and segmented content 252.

It is noted that the exemplary implementation shown in FIG. 2 corresponds to use cases in which content 246 is AV content including both video and audio. However, the present novel and inventive concepts are equally applicable to video content without accompanying audio, and to audio content without accompanying video.

Content 246, content segmentation software code 210, trained content subsection boundary prediction ML model 260, and segmented content 252 correspond respectively in general to content 146, content segmentation software code 110, trained content subsection boundary prediction ML model 160, and segmented content 152, in FIG. 1. Thus, content 146, content segmentation software code 110, trained content subsection boundary prediction ML model 160, and segmented content 152 may share any of the characteristics attributed to respective content 246, content segmentation software code 210, trained content subsection boundary prediction ML model 260, and segmented content 252 by the present disclosure, and vice versa. That is to say, although not shown in FIG. 1, like content segmentation software code 210, content segmentation software code 110 may include features corresponding to content distribution module 211, video encoder 262, audio encoder 264, and embedding vector combination module 266.

Referring to FIGS. 1 and 2 in combination, in some implementations, content segmentation software code 110/210, when executed by processing hardware 104 of computing platform 102, is configured to receive content 146/246 including multiple sections each having multiple content blocks in sequence, and to select one of the sections for segmentation. In addition, when executed by processing hardware 104 content segmentation software code 110/210 is also configured to identify, for each of the content blocks included in the selected section, at least one representative unit of content, such as a single frame of video representative of a shot, and to generate, using only that at least one representative unit of content, a respective embedding vector for each of the content blocks of the selected section to provide multiple embedding vectors. Content segmentation software code 110/210 is further configured to predict, using trained content subsection boundary prediction ML model 160/260 and the embedding vectors, multiple subsections of the selected section, at least some of the subsections including more than one content block. It is noted that although it is possible to generate more than one embedding vector per content block, those multiple embeddings would typically be compressed to form a single representative embedding vector per content block. An example of this type of aggregation of embedding vectors would be using attention mechanisms, as known in the art.

By way of example, where content 146/246 takes the form of AV content, such as episodic TV content or movie content, the sections included in content 146/246 may be acts, the content blocks included in each section may be shots of content, and the predicted subsections may be scenes of content. With respect to the expressions "shot" or "shots," it is noted that, as used in the present application, the term "shot" refers to a sequence of frames within a video file that are captured from a unique camera perspective without cuts and/or other cinematic transitions. In addition, as used in the present application, the term "scene" refers to a series of related shots. For instance, a scene may include a series of shots that share a common background, or depict the same location. Thus, different scenes may include different numbers of shots, while different shots may include different numbers of video frames. Moreover, as used in the present application, the term "act" refers to a section of content that typically includes multiple scenes that together provide a coherent dramatic or narrative arc that includes the features of rising action, climax, and resolution.

It is noted that the functionality attributed to content segmentation software code 110/210 above may be implemented to perform scene detection or location detection. Consequently, in some implementations, the content subsections predicted using content segmentation software code 110/210 and trained content subsection boundary prediction ML model 160/260 may each correspond to a different respective scene. However, in other implementations, the content subsections predicted using content segmentation software code 110/210 and trained content subsection boundary prediction ML model 160/260 may each correspond to a different respective location depicted by content 146/246.

According to the exemplary implementation shown in FIG. 2, content segmentation software code 210 receives content 246 in the form of AV content including multiple sections each having video component 212 and audio component 213. Content 246 may include a video game, a movie, or TV programming content including content broadcast, streamed, or otherwise downloaded or purchased on the Internet or a user application, for example. Content 246 may include a high-definition (HD) or ultra-HD (UHD) baseband video signal with embedded audio, captions, time code, and other ancillary metadata, such as ratings and parental guidelines. In some implementations, content 246 may be provided by content provider 134, shown in FIG. 1, such as a TV broadcast network or other media distribution entity (e.g., a movie studio, a streaming platform, etc.), utilizing secondary audio programming (SAP) or Descriptive Video Service (DVS), for example.

Continuing to refer to FIGS. 1 and 2 in combination, content segmentation software code 110/210, when executed by processing hardware 104 of computing platform 102, uses content distribution module 211 to identify each section of content included in content 146/246, and for each section, separate video component 212 from audio component 213. Video component 212 is transferred to video encoder 262 for processing, while audio component 213 is transferred to audio encoder 264. It is noted that in use cases in which content 246 includes video component 212 but not audio component 213, audio encoder 264 is bypassed, while in use cases in which content 246 includes audio component 213 but not video component 212, video encoder 262 is bypassed. It is further noted that when content 246 includes both video component 212 and audio component 213, video encoder 262 and audio encoder 264 may be configured to process respective video component 212 and audio component 213 in parallel, i.e., substantially concurrently.

As noted above, in some use cases, the sections of content included in content 146/246 may correspond to acts of a TV episode or movie. In some such cases, the sections or acts may be predetermined and segmented apart from one another within content 146/246. However, in other cases, content 146/246 may include multiple contiguous sections. Where content 146/246 includes a sequence of contiguous sections, content segmentation software code 110/210 may be configured to use content distribution module 211 to identify the boundaries of each section and to perform an initial segmentation of content 146/246 by separating the discrete sections of content. In some implementations, content distribution module 211 may utilize a computer vision algorithm that first segments video component 212 of content 146/246 into shots and identifies acts as sections that start after a shot composed of black frames and ends in another shot composed of black frames, for example.

Figure 3:
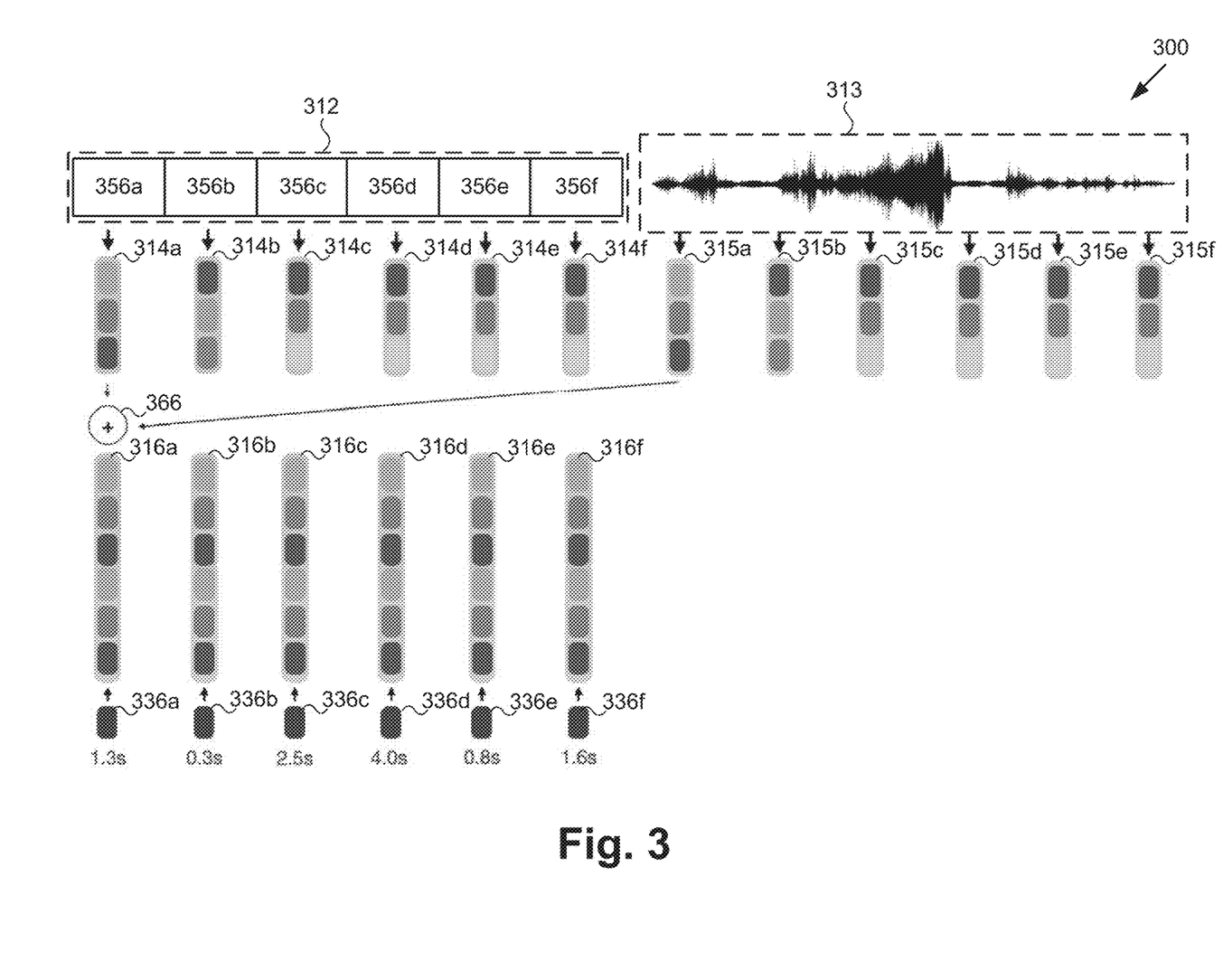
FIG. 3 depicts an exemplary process for generating embedding vectors, according to one implementation.

FIG. 3 shows diagram 300 depicting an exemplary process for generating embedding vectors including video embedding vectors 214, audio embedding vectors 215, and AV embedding vectors 216, in FIG. 2, according to one implementation. Referring to FIG. 3 in combination with FIGS. 1 and 2, FIG. 3 shows video component 312 of an exemplary section of content 146/246, audio component 313 of that same section, video embedding vectors 314a, 314b, 314c, 314d, 314e, and 314f (hereinafter "video embedding vectors 314a-314f"), audio embedding vectors 315a, 315b, 315c, 315d, 315e, and 315f (hereinafter "audio embedding vectors 315a-315f"), and AV embedding vectors 316a, 316b, 316c, 316d, 316e, and 316f (hereinafter "AV embedding vectors 316a-316f") each including a respective time duration 336a, 336b, 336c, 336d, 336e, and 336f (hereinafter "time durations 336a-336f"). Also shown in FIG. 3 are content blocks 356a, 356b, 356c, 356d, 356e, and 356f (hereinafter "content blocks 356a-356f") included in video component 312 of content 146/246, as well as embedding vector combination module 366.

It is noted that although FIG. 3 depicts processing of a sequence of six content blocks 356a-356f to produce six video embedding vectors 314a-314f, six audio embedding vectors 315a-315f, and six AV embedding vectors 316a-316f, that representation is merely by way of example. In other implementations sequences of more than or less than six content blocks may be processed. Moreover, in some implementations, content blocks 356a-356f may be processed to provide video embedding vectors 314a-314f but not audio embedding vectors 315a-315f or AV embedding vectors 316a-316f, or to provide audio embedding vectors 315a-315f but not video embedding vectors 314a-314f or AV embedding vectors 316a-316f.

Video component 312, audio component 313, and embedding vector combination module 366 correspond respectively in general to video component 212 and audio component 213, and embedding vector combination module 266, in FIG. 2. That is to say, video component 212, audio component 213, and embedding vector combination module 266 may share any of the characteristics attributed to respective video component 312, audio component 313, and embedding vector combination module 366 by the present disclosure, and vice versa. In addition, each of video embedding vectors 314a-314f, in FIG. 3, corresponds in general to video embedding vectors 214, in FIG. 2, each of audio embedding vectors 315a-315f corresponds in general to audio embedding vectors 215, and each of AV embedding vectors 316a-316f corresponds in general to AV embedding vectors 216. Thus video embedding vectors 314a-314f, audio embedding vectors 315-a-315f, and AV embedding vectors 316a-316f may share any of the characteristics attributed to respective video embedding vectors 214, audio embedding vectors 215, and AV embedding vectors 216 by the present disclosure, and vice versa.

Content segmentation software code 110/210, when executed by processing hardware 104, is configured to identify, for each of content blocks 356a-356f, one or more representative units of content. In some use cases in which content blocks 356a-356f are respective shots of video, for example, the representative unit of content for each shot may be a single image, i.e., a single video frame, from each shot. Alternatively, or in addition, the representative unit of content for each of content blocks 356a-356f may include the portion of audio component 213/313 included in each content block. For example, an audio spectrogram may be extracted from audio component 213/313 for each of content units 356a-356f and that audio spectrogram may be resized to match a fixed-sized sequence. Thus, the one or more representative unit or units of content for each of content blocks 356a-356f may be one or both of a single image and an audio sample, such as one or both of a video frame and an audio spectrogram, for example.

Content segmentation software code 110/210 then generates, using the one or more representative units of content for each content block, a respective embedding vector for each of content blocks 356a-356f of the selected section of content to provide multiple embedding vectors. As shown in FIG. 3, in various implementations, those multiple embedding vectors may include video embedding vectors 314a-314f, multiple audio embedding vectors 315a-315f, or multiple AV embedding vectors 316a-316f.

As represented in FIG. 3, in implementations in which video embedding vectors 314a-314f and audio embedding vectors 315a-315f are generated, the video embedding vector for a particular one of content blocks 356a-356f may be concatenated or otherwise combined with the audio embedding vector for that content block to provide an AV embedding vector for that content block. For example, video embedding vector 314a corresponding to content block 356a may be combined with audio embedding vector 315a also corresponding to content block 356a to provide AV embedding vector 316a for content block 356a. Analogously, video embedding vector 314b corresponding to content block 356b may be combined with audio embedding vector 315b also corresponding to content block 356b to provide AV embedding vector 316b for content block 356b, and so forth.

Because the process of generating and combining embedding vectors for a content block typically loses information about the duration of the content block, the time duration of each of respective content blocks 356a-356f may be added to its corresponding AV embedding vector. That is to say time duration 336a of content block 356a may be added to and thereby be included in AV embedding vector 316a for content block 356a, time duration 336b of content block 356b may be added to and thereby be included in AV embedding vector 316b for content block 356b, and so forth.

Video embedding vectors 214/314a-314f may be generated based on video component 212/312 of content 146/246 by content segmentation software code 110/210, executed by processing hardware 104, and using video encoder 262. Video encoder 262 may be a neural network (NN) based video encoder. For example, in some implementations, video encoder 262 may take the form of a pre-trained convolutional NN (CNN), such as a pre-trained ResNet34 for instance.

Audio embedding vectors 215/315a-315f may be generated based on audio component 213/313 of content 146/246 by content segmentation software code 110/210, executed by processing hardware 104, and using audio encoder 264. Where audio component 213/313 takes the form of an audio spectrogram or other type of acoustic fingerprint, such as a Chromaprint or Mel Spectrogram using the Mel (melody) scale for example, audio component 213/313 may be generated by content distribution module 211 of content segmentation software code 110/210 using an open source acoustic fingerprint extraction resource, such as Chromaprint software, for example. Audio encoder 264 may be a NN based audio encoder. In one implementation, audio encoder 264 may take the form of a pre-trained NN using 1D temporal convolutions to compress the audio data. In some implementations, it may be advantageous or desirable to employ dilation in order to attend to a wider context window. For example, two blocks of six layers of dilated temporal convolutions may be utilized, with a strided temporal convolution between the blocks to reduce dimensionality, then an AveragePool1d layer may be used to compress the output into a single audio embedding for each of content blocks 356a-356f.

In implementations in which video embedding vectors 314-a-314f are combined with audio embedding vectors 315a-315f to produce AV embedding vectors 316a-316f, as described above, AV embedding vectors 316a-316f may be generated by content segmentation software code 110/210, executed by processing hardware 104, and using embedding vector combination module 266/366.

Content segmentation software code 110/210, when executed by processing hardware 104, is further configured to predict, using trained content subsection boundary prediction ML model 160/260 and video embedding vectors 314-a314f or audio embedding vectors 315a-315f or AV embedding vectors 316a-316f, or any combination of video embedding vectors 314a-314f, audio embedding vectors 315a-315f, AV embedding vectors 316a-316f, multiple subsections of each section of content 146/246, at least some of the subsections including more than one of content blocks 356a-356f. However, it is noted that once AV embedding vectors 316a-316f are produced, trained content subsection boundary prediction ML model 160/260 can be used to predict the multiple subsections of each section of content 146/246 using AV embedding vectors 316a-316f alone, i.e., video embedding vectors 314a-314f and audio embedding vectors 315a-315f may be disregarded by trained content subsection boundary prediction ML model 160/260.

Figure 4A:
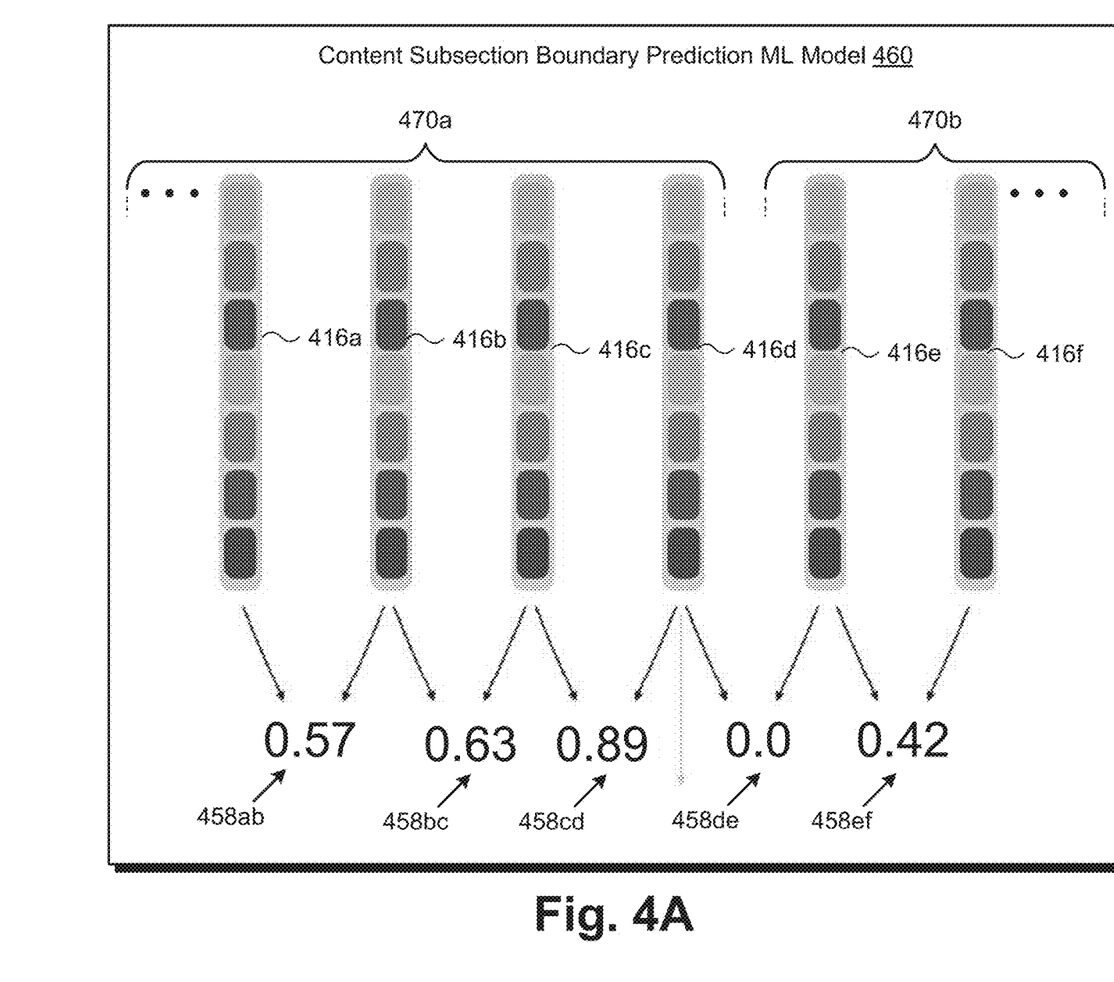
FIG. 4A depicts an initial stage of an exemplary process for predicting boundaries of content subsections, according to one implementation.

FIG. 4A depicts an initial stage of an exemplary process for predicting boundaries of content subsections, according to one implementation. FIG. 4A shows trained content subsection boundary prediction ML model 460 having ingested AV embedding vectors 416a, 416b, 416c, 416d, 416e, and 416f (hereinafter "AV embedding vectors 416a-416f") and having generated similarity scores 458ab, 458bc, 458cd, 458de, and 458ef. Also shown in FIG. 4A are predicted subsections 470a and 470b of content 146/246 in FIGS. 1 and 2, based on similarity scores 458ab, 458bc, 458cd, 458de, and 458ef.

Content subsection boundary prediction ML model 460 corresponds in general to content subsection boundary prediction ML model 160/260 in FIGS. 1 and 2. Consequently, content subsection boundary prediction ML model 160/260 may share any of the characteristics attributed to content subsection boundary prediction ML model 460, and vice versa. In addition, AV embedding vectors 416a-416f, in FIG. 4A, correspond respectively in general to AV embedding vectors 216/316a-316f, in FIGS. 2 and 3. Thus, AV embedding vectors 216/316a-316f may share any of the characteristics attributed to AV embedding vectors 416a-416f by the present disclosure, and vice versa.

According to the exemplary implementation shown in FIG. 4A, similarity scores 458ab, 458bc, 458cd, 458de, and 458ef each compares consecutive AV embedding vectors 416a-416f. That is to say similarity score 458ab corresponds to the similarity of AV embedding vector 416a to AV embedding vector 416b, similarity score 458bc corresponds to the similarity of AV embedding vector 416b to AV embedding vector 416c, similarity score 458cd corresponds to the similarity of AV embedding vector 416c to AV embedding vector 416d, and so forth. Thus, referring to FIGS. 1, 2, 3, and 4A, in some implementations processing hardware 104 executes content segmentation software code 110/210 to use trained content subsection boundary prediction ML model 160/260/460 to predict subsections 470a and 470b of a selected section of content 146/246 by comparing pairs of AV embedding vectors 216/316a-316f/416a-416f corresponding respectively to consecutive pairs of content blocks 356a-356f.

Content subsection boundary prediction ML model 160/260/460 may employ temporal 1D convolutions without dilation. The final layer of trained content subsection boundary prediction ML model 160/260/460 outputs a single value, i.e., one of similarity scores 458ab, 458bc, 458cd, 458de, and 458ef for each pair of AV embedding vectors 216/316a-316f/416a-416f, so a sequence of six AV embedding vectors 216/316a-316f/416a-416f will result in five similarity score outputs. It is noted that during training of content subsection boundary prediction ML model 160/260/460 it may be advantageous or desirable to output three different similarity score values for each pair of content blocks 356a-356f: one using only video embedding vectors 214/314a-314f, another using only audio embedding vectors 215/314a-315f, and a third one using a combination of video embedding vectors 214/314a-314f with respective audio embedding vectors 215/315a-315f.

As shown in FIG. 4A, in some implementations, similarity scores 458ab, 458bc, 458cd, 458de, and 458ef may be normalized to have values in a range from zero (0.0) to one (1.0), with higher values corresponding to greater similarity and lower values being more likely to correspond to boundaries between content subsections. Thus, referring to the exemplary use case in which the content subsection predicted is a scene and each of AV embedding vectors 216/316a-316f/416a-416f corresponds to a single shot, lowest similarity score 458de enables content subsection boundary prediction ML model 460 to predict that AV embedding vector 416d corresponds to the last shot in content subsection (scene) 470a, while subsequent AV embedding vector 416e corresponds to the first shot in content subsection (scene) 470b.

It is noted that although similarity score 458de is 0.0, in other instances differences between content subsections may predicted based on non-zero similarity scores. For example a predetermined or dynamically determined threshold similarity criterion may be an adjustable hyperparameter of trained content subsection boundary prediction ML model 460, used to predict the boundaries of content subsections. For instance, in the exemplary use case shown in FIG. 4A, threshold similarity criterion of 0.2 or less, for example, would also result in prediction of AV embedding vector 416d as corresponding to the last shot in content subsection (scene) 470a, and AV embedding vector 416e corresponding to the first shot in content subsection (scene) 470b. Thus, boundaries of content subsections may be predicted based on the similarity score between consecutive embedding vectors being less than or equal to a threshold value.

Figure 4B:
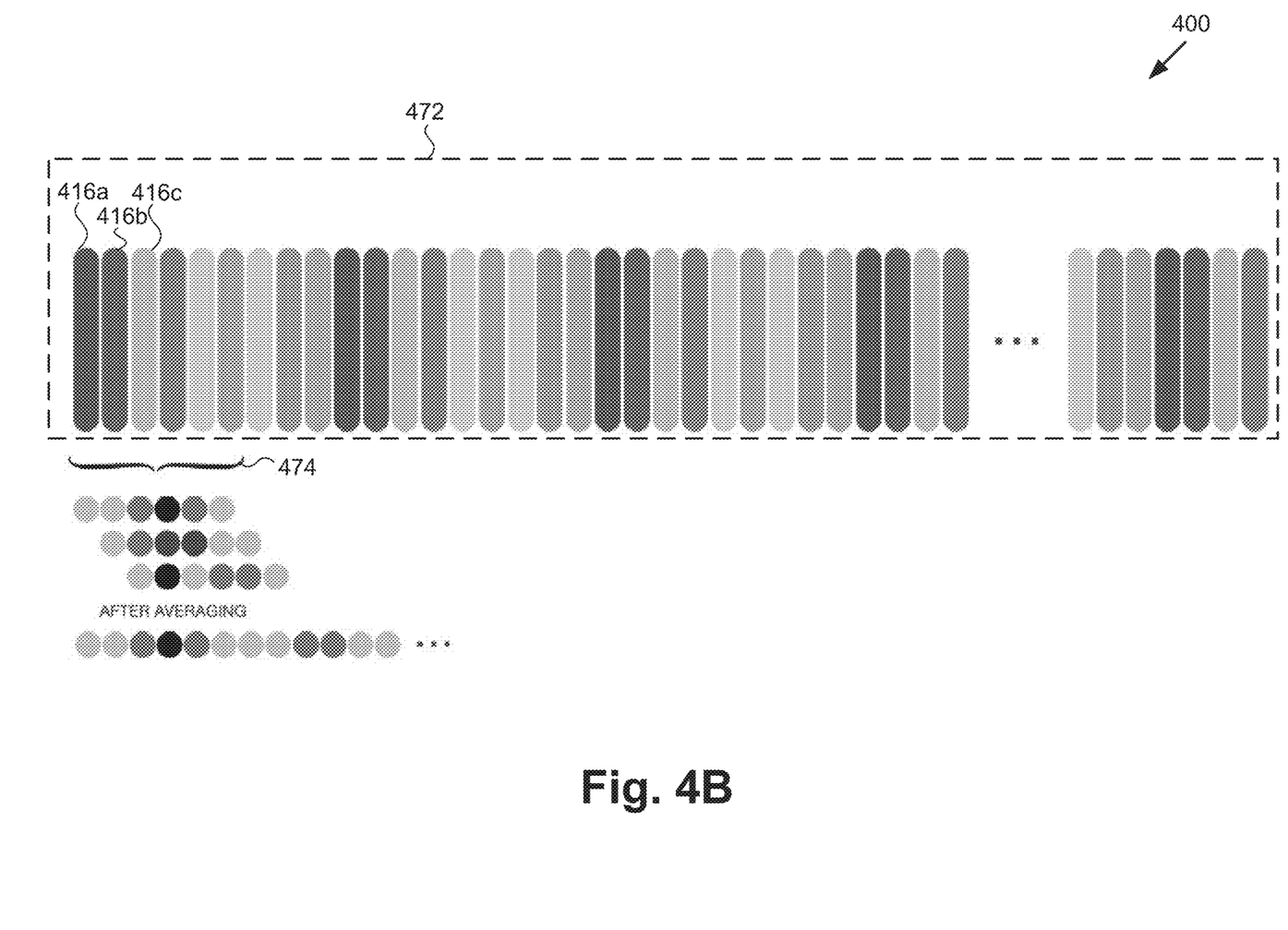
FIG. 4B depicts a subsequent stage of an exemplary process for predicting boundaries of content subsections, according to one implementation.

FIG. 4B shows diagram 400 depicting a subsequent stage of an exemplary process for predicting boundaries of content subsections, according to one implementation. FIG. 4B shows multiple AV embedding vectors represented by exemplary AV embedding vectors 416a, 416b, and 416c corresponding respectively to each content block included in section 472 of content 146/246 in FIGS. 1 and 2. Also shown in FIG. 4B is sliding window 474 used to compare different sequences of AV embedding vectors. For example, in implementations in which content subsection boundary prediction ML model 460, in FIG. 4A, is trained with sequences of six content blocks, sliding window 474 of size six and step one can be used in order to predict content subsection boundaries on longer sequences, such as the entirety of section 472. It is noted that the size of sliding window 474 is a parameter of trained content subsection boundary prediction ML model 460 that can be adjusted. For example, and referring to FIG. 1, in use cases in which it is desirable to segment content based on manually segmented content sample 148, the size of sliding window 474 may be adjusted to one that better replicates the manual segmentation.

Use of sliding window 474 is typically an automated process and provides multiple predictions for most content blocks that can then be averaged, as depicted in FIG. 4B, to get a final, more accurate, prediction. For example, each different window position provides a boundary prediction, and the averaging involves averaging the boundary predictions of each window position as it slides over a predetermined number of embedding vectors. As a specific example, where the window size is six, the boundary predictions resulting from moving sliding window 474 across six embedding vectors using step one would be averaged to provide final boundary predictions.

In some implementations, the final prediction produced by system 100 can be used to retrain or further train content subsection boundary prediction ML model 160/260/460. For example, content editor 144 may review segmented content 152/252 output by system 100, and may provide feedback to system 100 correcting or ratifying segmentation predictions made by content subsection boundary prediction ML model 160/260/460. In those implementations, content segmentation software code 110/210 may use the feedback provided by content editor 144 to tune hyperparameters of content subsection boundary prediction ML model 160/260/460 so as to improve its predictive performance.

It is noted that in some implementations, system 100 may employ heuristics to identify sub-subsections of the subsections of content 146/246 having the boundaries predicted using the approach described above. For example, where subsections 470a and 470b in FIG. 4A correspond to different scenes, processing hardware 104 may execute content segmentation software code 110/210 to identify sub-scenes within a scene, based, for instance, on whether a sequence of content blocks is situated at or near the beginning of a scene, or at or near the end of the scene. As another example, if the first shot of a scene is an exterior location and the second shot of that scene is an interior location the first shot may be recognized as a placement shot and may be identified as one sub-scene and another portion or all other portions of the scene may be recognized as another sub-scene.

Referring to FIGS. 1, 2, and 4A in combination, as noted above, in some implementations, content segmentation software code 110/210, executed by processing hardware 104, may receive manually segmented content sample 148 from user system 140, and may utilize manually segmented content sample 148 as a template or recipe for adjusting one or more hyperparameters of trained content subsection boundary prediction ML model 160/260/460. As a result, trained content subsection boundary prediction ML model 160/260/460 may advantageously be used to produce segmented content 152/252 according to the editorial preferences of content editor 144, also in a substantially automated process, e.g., an "auto-complete" process. It is noted that segmented content 152/252 is content 146/246 having the boundaries of its subsections identified. In other words, content segmentation software code 110/210, when executed by processing hardware 104, may receive manually segmented content sample 148, and may adjust, based on manually segmented content sample 148 before using trained content subsection boundary prediction ML model 160/260/460 to predict subsections 470a and 470b, one or more hyperparameters of trained content subsection boundary prediction ML model 160/260/460 to substantially replicate manually segmented content sample 148.

In some implementations, it may be advantageous or desirable to identify sections of fungible content included in content 146/246 in order to reduce the processing overhead required to produce segmented content 152/252. As noted above, fungible content refers to sections of content that are substantially the same from one version to another of content in which the fungible content is included. As further noted above, examples of fungible content included in episodic TV content may include the introduction to the episode, credits, and short introductions following a commercial break, to name a few. Identification of sections of content 146/246 as fungible content that is non-selectable by content segmentation software code 110/210 prior to processing of content 146/246 by content segmentation software code 110/210 advantageously increases the speed and efficiency with which segmented content 152/252 can be output, while concurrently reducing the cost of processing content 146/246.

Figure 5:
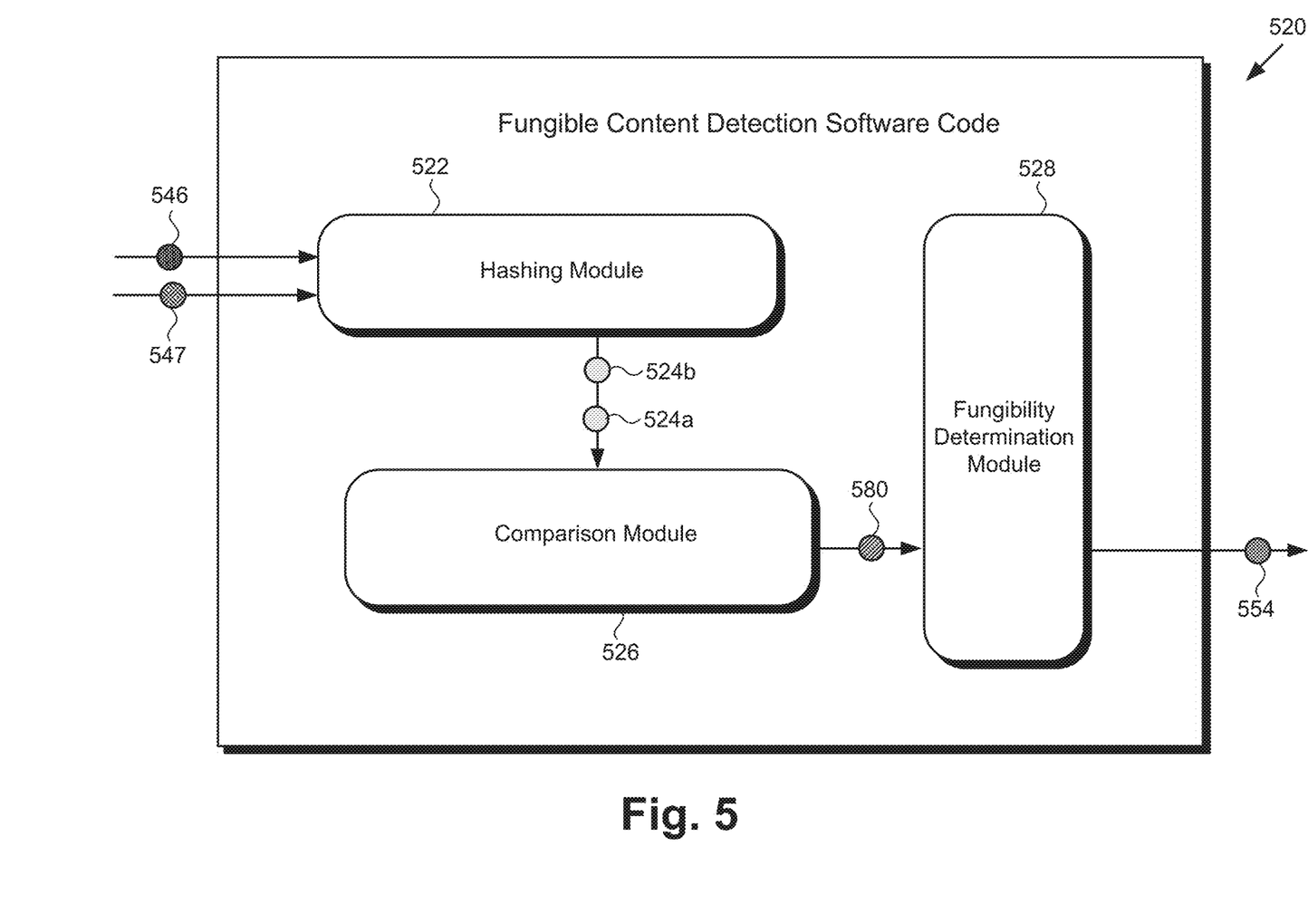
FIG. 5 shows a diagram of an exemplary fungible content detection software code suitable for use by the system in FIG. 1, according to one implementation.

FIG. 5 shows a diagram of exemplary fungible content detection software code 520 suitable for use by system 100, in FIG. 1, according to one implementation. By way of overview, it is noted that fungible content detection software code 520, when executed by processing hardware 104, is configured to obtain content 146/246 from content segmentation software code 110/210, obtain comparison content 147, identify, using content 146/246 and comparison content 147 before content segmentation software code 110/210 is executed to select one of the multiple sections of content 146/246 for segmentation, one or more of those sections of content 146/246 as fungible content section(s), and flag the fungible content section(s) as non-selectable by content segmentation software code 110/210.

According to the exemplary implementation shown in FIG. 5, fungible content detection software code 520 may include hashing module 522, comparison module 526, and fungibility determination module 528. Also shown in FIG. 5 are content 546, comparison content 547, content hash vectors 524*a*, comparison content hash vectors 524*b*, comparison data 580, and fungible content identification data 554.

Fungible content detection software code 520, comparison content 547, and fungible content identification data 554 correspond respectively in general to fungible content detection software code 120, comparison content 147, and fungible content identification data 154, in FIG. 1. Consequently, fungible content detection software code 120, comparison content 147, and fungible content identification data 154 may share any of the characteristics attributed to respective fungible content detection software code 520, comparison content 547, and fungible content identification data 554 by the present disclosure, and vice versa. Thus, although not shown in FIG. 1, fungible content detection software code 120, like fungible content detection software code 520, may include features corresponding to hashing module 522, comparison module 526, and fungibility determination module 528. Moreover, content 546 corresponds in general to content 146/246 in FIGS. 1 and 2, and those corresponding features may share the characteristics attributed to any of those corresponding features by the present disclosure.

As noted above, fungible content sections in a TV series, for example, are parts of the episodes that are identical in all episodes. Continuing to refer to the exemplary use case in which content 146/246/546 is episodic TV content, fungible content detection software code 120/520 takes as input two or more episodes from each season of a TV show, i.e., content 146/246/546 and comparison content 147/547. However, in use cases in which content 146/246/546 is movie content or video game content, comparison content 147/547 may include short clips announcing one or more of production houses, post-production houses, and credits.

According to the exemplary implementation shown in FIG. 5, fungible content detection software code 120/520 may use hashing module 522 to generate a hash vector for each predetermined video frame or other predetermined content unit of content 146/246/546 and comparison content 147/547 to provide content hash vectors 524*a* and comparison content hash vectors 524*b*. Those hash vectors may be aggregated by similarity in hash blocks. By comparing these content hash vectors 524*a* and comparison content hash vectors 524*b* between episodes using comparison module 526 it is possible for fungible content detection software code 120/520 to identify sequences of hashes that are equal in two or more episodes. In one implementation, for example, comparison module 526 may use a data structure known as Generalized Suffix Tree to accelerate the comparison process.

Once sequences of hash vectors that are equal are identified, they can be smoothed, and fungible content determination module may use comparison data 580 output by comparison module 526 to determine whether the content sections corresponding to those equal hash vector sequences are fungible content sections based further on one or both of their time duration and their locations within content 146/246/546 and comparison content 147/547. Thus, more generally, processing hardware 104 may execute fungible content detection software code 120/520 to generate, for each content unit included in content 146/246/546 and for each comparison content unit included in comparison content 147/547, a respective hash vector, and determine, for each of the content units and the comparison content units, respective time durations. A fungible content section can then be identified based on comparison of the respective hash vectors and time durations of each of the content units included in content 146/246/546 with the respective hash vectors and time durations of each of the comparison content units included in comparison content 147/547.

It is noted that, in addition to, or as an alternative to detecting fungible content, the ability of fungible content detection software code 120/520 to detect similar segments of content between two or more AV sequences can be used to map annotations or "tags" from one AV sequence to another, or to signal the differences or similarities between two AV sequences that are ostensibly the same, e.g., to track changes from one version of an episode to another version of the same episode. As another example, by using the functionality enabled by fungible content detection software code 120/520 to analyze multiple episodes from the same TV series, content appearing in a present episode as regular content and in future episodes as recap content can be identified. This identification could advantageously be used to recommend that a viewer of the TV series review an old episode or the original scenes that the recap refers to, and to notify the viewer which episode or scenes the content originally appeared in. Another use case for such identification of recurring content may be to flag the content that appears afterwards in recaps as key points in the storyline of the TV series.

Thus, the present application discloses systems and computer-readable non-transitory storage media including instructions for performing content segmentation and identification of fungible content that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform including processing hardware and a system memory;
    a software code stored in the system memory; and
    a machine learning model trained to predict scene boundaries;
    the processing hardware configured to execute the software code to:
        receive content, the content including a plurality of acts each having a plurality of shots in sequence;
        select one of the plurality of acts for segmentation;
        identify, for each of the plurality of shots of the selected act, at least one respective representative unit of content, the at least one respective unit of content comprising at least one video frame, an audio sample, or a combination thereof;

generate, using the at least one respective representative unit of content, a respective embedding vector for each of the plurality of shots of the selected act to provide a plurality of embedding vectors; and predict, using the machine learning model and the plurality of embedding vectors, respective scene boundaries of each of a plurality of scenes of the selected act, at least one of the plurality of scenes including more than one of the plurality of shots.

2. The system of claim 1, wherein the processing hardware is configured to execute the software code to use the machine learning model to predict the respective scene boundaries of each of the plurality of scenes of the selected act by comparing pairs of the plurality of embedding vectors corresponding respectively to consecutive pairs of the plurality of shots.

3. The system of claim 1, wherein each of the plurality of scenes of the selected act corresponds to a different respective location depicted by the content.

4. The system of claim 1, wherein the at least one respective representative unit of content consists of a single video frame or an audio spectrogram.

5. The system of claim 1, wherein the at least one respective representative unit of content comprises the audio sample, and the audio sample comprises an audio spectrogram.

6. The system of claim 1, wherein the processing hardware is further configured to execute the software code to:
receive, from a user system, a manually segmented content sample prepared by a user; and
adjust, based on the manually segmented content sample, one or more hyperparameters of the machine learning model to substantially replicate the manually segmented content sample.

7. The system of claim 1, wherein the respective embedding vector for each one of the plurality of shots is an audio-video embedding vector, and wherein a first audio-video embedding vector corresponding to a first shot of the plurality of shots includes a video embedding vector for the first shot combined with an audio embedding vector for the first shot.

8. The system of claim 7, wherein the first audio-video embedding vector further includes a time duration of the first shot.

9. The system of claim 1, wherein the processing hardware is further configured to execute the software code to:
identify, using computer vision, the plurality of acts included in the content.

10. The system of claim 1, wherein the respective scene boundaries of each of the plurality of scenes of the selected act are predicted based on a similarity score between consecutive embedding vectors being less than or equal to a threshold value.

11. A computer-readable non-transitory storage medium having stored thereon instructions, which when executed by a processing hardware of a system, instantiate a method comprising:
receiving content, the content including a plurality of acts each having a plurality of shots in sequence;
selecting one of the plurality of acts for segmentation;
identifying, for each of the plurality of shots of the selected act, at least one respective representative unit of content, the at least one respective unit of content comprising at least one video frame, an audio sample, or a combination thereof;
generating, using the at least one respective representative unit of content, a respective embedding vector for each of the plurality of shots of the selected act to provide a plurality of embedding vectors; and
predicting, using a machine learning model and the plurality of embedding vectors, respective scene boundaries of each of a plurality of scenes of the selected act, at least one of the plurality of scenes including more than one of the plurality of shots.

12. The computer-readable non-transitory storage medium of claim 11, wherein predicting the respective scene boundaries of each of the plurality of scenes of the selected act comprises comparing pairs of the plurality of embedding vectors corresponding respectively to consecutive pairs of the plurality of shots.

13. The computer-readable non-transitory storage medium of claim 11, wherein each of the plurality of scenes of the selected act corresponds to a different respective location depicted by the content.

14. The computer-readable non-transitory storage medium of claim 11, wherein the at least one respective representative unit of content consists of a single video frame or an audio spectrogram.

15. The computer-readable non-transitory storage medium of claim 11, wherein the at least one respective representative unit of content comprises the audio sample, and the audio sample comprises an audio spectrogram.

16. The computer-readable non-transitory storage medium of claim 11, having stored thereon additional instructions, which when executed by the processing hardware of the system, instantiate the method further comprising:
receiving, from a user system, a manually segmented content sample prepared by a user; and
adjusting, based on the manually segmented content sample, one or more hyperparameters of the machine learning model to substantially replicate the manually segmented content sample.

17. A method for use by a system including a computing platform having processing hardware, a system memory storing a software code, and a machine learning model trained to predict scene boundaries, the method comprising:
receiving content, by the software code executed by the processing hardware, the content including a plurality of acts each having a plurality of shots in sequence;
selecting, by the software code executed by the processing hardware, one of the plurality of acts for segmentation;
identifying, by the software code executed by the processing hardware for each of the plurality of shots of the selected act, at least one respective representative unit of content, the at least one respective unit of content comprising at least one video frame, an audio sample, or a combination thereof;
generating, by the software code executed by the processing hardware and using the at least one respective representative unit of content, a respective embedding vector for each of the plurality of shots of the selected act to provide a plurality of embedding vectors; and
predicting, by the software code executed by the processing hardware using the machine learning model and the plurality of embedding vectors, respective scene boundaries of each of a plurality of scenes of the selected act, at least one of the plurality of scenes including more than one of the plurality of shots.

18. The method of claim 17, wherein predicting the respective scene boundaries of each of the plurality of scenes of the selected act comprises comparing pairs of the plurality of embedding vectors corresponding respectively to consecutive pairs of the plurality of shots.

19. The method of claim 17, wherein each of the plurality of scenes of the selected act corresponds to a different respective location depicted by the content.

20. The method of claim 17, further comprising:
receiving from a user system, by the software code executed by the processing hardware, a manually segmented content sample prepared by a user; and
adjusting, by the software code executed by the processing hardware based on the manually segmented content sample, one or more hyperparameters of the machine learning model to substantially replicate the manually segmented content sample.

* * * * *